United States Patent
Benton et al.

(10) Patent No.: US 9,861,937 B2
(45) Date of Patent: Jan. 9, 2018

(54) ADVANCEMENTS IN OSMOTICALLY DRIVEN MEMBRANE SYSTEMS INCLUDING LOW PRESSURE CONTROL

(71) Applicant: Porifera, Inc., Hayward, CA (US)

(72) Inventors: Charles Benton, Berkeley, CA (US); Christopher Keith, Alameda, CA (US); Carl Lundin, Honolulu, HI (US)

(73) Assignee: Porifera, Inc., Hayward, CA (US)

( * ) Notice: Subject to any disclaimer, the term of this patent is extended or adjusted under 35 U.S.C. 154(b) by 0 days.

(21) Appl. No.: 14/777,406

(22) PCT Filed: Mar. 14, 2014

(86) PCT No.: PCT/US2014/029227
§ 371 (c)(1),
(2) Date: Sep. 15, 2015

(87) PCT Pub. No.: WO2014/144704
PCT Pub. Date: Sep. 18, 2014

(65) Prior Publication Data
US 2016/0038880 A1 Feb. 11, 2016

Related U.S. Application Data

(60) Provisional application No. 61/794,537, filed on Mar. 15, 2013.

(51) Int. Cl.
*B01D 61/58* (2006.01)
*B01D 61/02* (2006.01)
(Continued)

(52) U.S. Cl.
CPC .......... *B01D 61/58* (2013.01); *B01D 61/002* (2013.01); *B01D 61/02* (2013.01); *B01D 61/022* (2013.01);
(Continued)

(58) Field of Classification Search
CPC .... B01D 61/58; B01D 61/027; B01D 61/022; B01D 61/02; B01D 61/06; B01D 61/002;
(Continued)

(56) References Cited

U.S. PATENT DOCUMENTS 3,352,422 A 11/1967 Heden
3,721,621 A 3/1973 Hough
(Continued)

FOREIGN PATENT DOCUMENTS

CN 101228214 A 7/2008
CN 102674605 A 9/2012
(Continued)

OTHER PUBLICATIONS

International Search Report and Written Opinion for app. No. PCT/US2014/029227 dated Jul. 1, 2014.
Akthakul, et al., "Antifouling polymer membranes with subnanometer size selectivity", Macromolecules 37, Sep. 3, 2004, 7663-7668.
Cath, et al., "Forward osmosis: principles, applications and recent developments", Journal of Membrane Science 281, May 31, 2006, 70-87.
(Continued)

*Primary Examiner* — David C Mellon
(74) *Attorney, Agent, or Firm* — Dorsey & Whitney LLP

(57) ABSTRACT

An example water purification system includes a forward osmosis module, a reverse osmosis module, a pump powered by an electric motor, and a pressure sensor. The forward osmosis module may receive a feed stream and a draw stream, and may produce an intermediate product stream. The intermediate product stream may be pressurized by a pump and provided to the reverse osmosis module. The reverse osmosis module may generate a product stream and return the draw stream to the forward osmosis module. The pressure sensor may monitor the pressure of the intermediate product stream, and the pressure may be used to determine the speed of the electric motor.

13 Claims, 3 Drawing Sheets

(51) Int. Cl.
  *B01D 65/02* (2006.01)
  *C02F 1/44* (2006.01)
  *B01D 61/06* (2006.01)
  *B01D 61/12* (2006.01)
  *B01D 61/00* (2006.01)

(52) U.S. Cl.
  CPC ......... *B01D 61/025* (2013.01); *B01D 61/027* (2013.01); *B01D 61/06* (2013.01); *B01D 61/12* (2013.01); *B01D 65/02* (2013.01); *C02F 1/441* (2013.01); *C02F 1/445* (2013.01); *B01D 2311/14* (2013.01); *B01D 2311/25* (2013.01); *B01D 2313/243* (2013.01); *B01D 2313/246* (2013.01); *B01D 2317/02* (2013.01); *B01D 2317/025* (2013.01); *B01D 2317/08* (2013.01); *B01D 2321/16* (2013.01); *B01D 2325/20* (2013.01)

(58) Field of Classification Search
  CPC ...... B01D 61/025; B01D 61/12; B01D 65/02; B01D 2317/025; B01D 2317/08; B01D 2317/02; B01D 2325/20; B01D 2321/16; B01D 2311/14; B01D 2313/243; B01D 2313/25; B01D 2313/246; C02F 1/441; C02F 1/445
  See application file for complete search history.

(56) References Cited

U.S. PATENT DOCUMENTS

| | | | |
|---|---|---|---|
| 4,326,509 A | 4/1982 | Usukura |
| 4,428,720 A | 1/1984 | Van Erden et al. |
| 4,454,176 A | 6/1984 | Buckfelder et al. |
| 4,618,533 A | 10/1986 | Steuck |
| 4,756,835 A | 7/1988 | Wilson |
| 4,792,402 A | 12/1988 | Fricker |
| 5,084,220 A | 1/1992 | Moller |
| 5,100,556 A | 3/1992 | Nichols |
| 5,192,434 A | 3/1993 | Moller |
| 5,593,738 A | 1/1997 | Ihm et al. |
| 6,261,879 B1 | 7/2001 | Houston et al. |
| 6,406,626 B1 | 6/2002 | Murakami et al. |
| 6,413,070 B1 | 7/2002 | Meyering et al. |
| 6,513,666 B2 | 2/2003 | Meyering et al. |
| 6,755,970 B1 | 6/2004 | Knappe et al. |
| 6,849,184 B1 | 2/2005 | Lampi et al. |
| 6,884,375 B2 | 4/2005 | Wang et al. |
| 6,992,051 B2 | 1/2006 | Anderson |
| 7,205,069 B2 | 4/2007 | Smalley et al. |
| 7,445,712 B2 | 11/2008 | Herron |
| 7,611,628 B1 | 11/2009 | Hinds, III |
| 7,627,938 B2 | 12/2009 | Kim et al. |
| 7,901,578 B2 | 3/2011 | Pruet |
| 7,955,506 B2 | 6/2011 | Bryan et al. |
| 8,029,671 B2 | 10/2011 | Cath et al. |
| 8,029,857 B2 | 10/2011 | Hoek et al. |
| 8,038,887 B2 | 10/2011 | Bakajin et al. |
| 8,083,942 B2 | 12/2011 | Cath et al. |
| 8,177,978 B2 | 5/2012 | Kurth et al. |
| 8,246,791 B2 | 8/2012 | McGinnis et al. |
| 8,252,350 B1 | 8/2012 | Cadwalader et al. |
| 8,356,717 B2 | 1/2013 | Waller, Jr. et al. |
| 8,518,276 B2 | 8/2013 | Striemer et al. |
| 8,567,612 B2 | 10/2013 | Kurth et al. |
| 8,960,449 B2 | 2/2015 | Tomioka et al. |
| 2002/0063093 A1 | 5/2002 | Rice et al. |
| 2002/0148769 A1 | 10/2002 | Deuschle et al. |
| 2003/0038074 A1 | 2/2003 | Patil |
| 2003/0173285 A1 | 9/2003 | Schmidt et al. |
| 2004/0004037 A1 | 1/2004 | Herron |
| 2004/0071951 A1 | 4/2004 | Jin |
| 2005/0142385 A1 | 6/2005 | Jin |
| 2006/0144789 A1 | 7/2006 | Cath et al. |
| 2006/0233694 A1 | 10/2006 | Sandhu et al. |
| 2008/0017578 A1 | 1/2008 | Childs et al. |
| 2008/0149561 A1 | 6/2008 | Chu et al. |
| 2008/0210370 A1 | 9/2008 | Smalley et al. |
| 2008/0223795 A1 | 9/2008 | Bakajin et al. |
| 2008/0236804 A1 | 10/2008 | Cola et al. |
| 2008/0290020 A1 | 11/2008 | Marand et al. |
| 2009/0078640 A1 | 3/2009 | Chu et al. |
| 2009/0214847 A1 | 8/2009 | Maruyama et al. |
| 2009/0250392 A1 | 10/2009 | Thorsen et al. |
| 2009/0272692 A1 | 11/2009 | Kurth et al. |
| 2009/0283475 A1 | 11/2009 | Hylton et al. |
| 2009/0308727 A1 | 12/2009 | Kirts |
| 2009/0321355 A1 | 12/2009 | Ratto et al. |
| 2010/0025330 A1 | 2/2010 | Ratto et al. |
| 2010/0051538 A1 | 3/2010 | Freeman et al. |
| 2010/0059433 A1 | 3/2010 | Freeman et al. |
| 2010/0062156 A1 | 3/2010 | Kurth et al. |
| 2010/0140162 A1 | 6/2010 | Jangbarwala |
| 2010/0155333 A1 | 6/2010 | Husain et al. |
| 2010/0206743 A1 | 8/2010 | Sharif et al. |
| 2010/0206811 A1 | 8/2010 | Ng et al. |
| 2010/0212319 A1 | 8/2010 | Donovan |
| 2010/0224550 A1 | 9/2010 | Herron |
| 2010/0224561 A1 | 9/2010 | Marcin |
| 2010/0320140 A1 | 12/2010 | Nowak et al. |
| 2010/0326833 A1 | 12/2010 | Messalem et al. |
| 2011/0017666 A1 | 1/2011 | Cath et al. |
| 2011/0036774 A1 | 2/2011 | McGinnis |
| 2011/0057322 A1 | 3/2011 | Matsunaga et al. |
| 2011/0073540 A1 | 3/2011 | McGinnis et al. |
| 2011/0132834 A1 | 6/2011 | Tomioka et al. |
| 2011/0133487 A1* | 6/2011 | Oklejas, Jr. ............ F03G 7/005 290/1 R |
| 2011/0186506 A1 | 8/2011 | Ratto et al. |
| 2011/0220574 A1 | 9/2011 | Bakajin et al. |
| 2011/0284456 A1 | 11/2011 | Brozell et al. |
| 2012/0043274 A1 | 2/2012 | Chi et al. |
| 2012/0080378 A1 | 4/2012 | Revanur et al. |
| 2012/0080381 A1 | 4/2012 | Wang et al. |
| 2012/0103892 A1 | 5/2012 | Beauchamp et al. |
| 2012/0118743 A1 | 5/2012 | Liang et al. |
| 2012/0118826 A1 | 5/2012 | Liberman et al. |
| 2012/0118827 A1 | 5/2012 | Chang et al. |
| 2012/0132595 A1 | 5/2012 | Bornia |
| 2012/0231535 A1 | 9/2012 | Herron et al. |
| 2012/0241371 A1 | 9/2012 | Revanur et al. |
| 2012/0251521 A1 | 10/2012 | Rostro et al. |
| 2012/0261321 A1 | 10/2012 | Han et al. |
| 2012/0267297 A1 | 10/2012 | Iyer |
| 2012/0267306 A1 | 10/2012 | McGinnis et al. |
| 2012/0273421 A1 | 11/2012 | Perry et al. |
| 2013/0001162 A1 | 1/2013 | Yangali-Quintanilla et al. |
| 2013/0095241 A1 | 4/2013 | Lulevich et al. |
| 2013/0105383 A1 | 5/2013 | Tang et al. |
| 2013/0126431 A1* | 5/2013 | Henson ................ C02F 9/00 210/638 |
| 2013/0203873 A1 | 8/2013 | Linder et al. |
| 2013/0220581 A1 | 8/2013 | Herron et al. |
| 2014/0015159 A1 | 1/2014 | Lazar et al. |
| 2014/0175011 A1 | 6/2014 | Benton et al. |
| 2014/0302579 A1 | 10/2014 | Boulanger et al. |
| 2014/0319056 A1 | 10/2014 | Fuchigami et al. |
| 2015/0014232 A1 | 1/2015 | McGinnis et al. |
| 2015/0064306 A1 | 3/2015 | Tatera |
| 2015/0273399 A1 | 10/2015 | Roh et al. |
| 2016/0136577 A1 | 5/2016 | McGovern et al. |
| 2016/0136578 A1 | 5/2016 | McGovern et al. |
| 2016/0136579 A1 | 5/2016 | McGovern et al. |
| 2016/0230133 A1 | 8/2016 | Peterson et al. |
| 2017/0197181 A1 | 7/2017 | Benton et al. |

FOREIGN PATENT DOCUMENTS

| | | |
|---|---|---|
| FR | 2189091 A1 | 1/1974 |
| JP | S55149682 A | 11/1980 |
| JP | 59059213 A | 4/1984 |
| JP | S5959213 A | 4/1984 |
| JP | 62-140620 A | 6/1987 |

(56) References Cited

FOREIGN PATENT DOCUMENTS

| | | |
|---|---|---|
| JP | 2005-138028 A | 6/2005 |
| JP | 2010094641 A | 4/2010 |
| JP | 2012183492 A | 9/2012 |
| KP | 101229482 B1 | 2/2013 |
| KR | 101144316 B1 | 5/2012 |
| WO | 1993010889 | 6/1993 |
| WO | 9962623 | 12/1999 |
| WO | 0213955 A1 | 2/2002 |
| WO | 2006040175 A1 | 4/2006 |
| WO | 2008137082 A1 | 11/2008 |
| WO | 2009/035415 | 3/2009 |
| WO | 2009039467 A1 | 3/2009 |
| WO | 2009129354 A2 | 10/2009 |
| WO | 2010006196 A2 | 1/2010 |
| WO | 2010067063 A1 | 6/2010 |
| WO | 2010144057 A1 | 12/2010 |
| WO | 2011028541 A1 | 3/2011 |
| WO | 2012/047282 | 4/2012 |
| WO | 2012/084960 | 6/2012 |
| WO | 2012095506 A1 | 7/2012 |
| WO | 2012102677 A1 | 8/2012 |
| WO | 2012/135065 | 10/2012 |
| WO | 2013/022945 A2 | 2/2013 |
| WO | 2013/059314 | 4/2013 |
| WO | 2014/071238 A1 | 5/2014 |
| WO | 2014100766 A2 | 6/2014 |
| WO | 2014144704 A1 | 9/2014 |
| WO | 2014144778 A1 | 9/2014 |
| WO | 2016210337 A2 | 12/2016 |

OTHER PUBLICATIONS

Li, et al., "Electronic properties of multiwalled carbon nanotubes in an embedded vertical array", Applied Physics Letters vol. 81, No. 5, 2002, 910-912.

Mandal, et al., "Drug delivery system based on chronobiology—a review", Journal of Controlled Release 147, Aug. 4, 2010, 314-325.

McCutcheon, et al., "Influence of membrane support layer hydrophobicity on water flux in osmotically driven membrane processes", Journal of Membrane Science, Mar. 2008, 458-466.

McEuen, P. et al., "Single-Walled Nanotubes Electronics", IEEE Transactions on Nanotechnology, Vo.1, No. 1, Mar. 2002.

Santus, et al., "Osmotic drug delivery: a review of the patent literature", Journal of Controlled Release 35, Jul. 1995, 1-21.

Sotthivirat, et al., "Controlled porosity-osmotic pump pellets of a poorly water-soluble drug using sulfobutylether-b-cyclodestrin, (SBE)_7M-b-CD, as a solubilizing and osmotic agent", Journal of Pharmaceutical Sciences vol. 96, No. 9, Sep. 2007, 2364-2374.

Yip, Nagai Y. et al., "High Performance Thin-Film Composite Forward Osmosis Membrane", Environmental Science & Technology, vol. 44, No. 10, 2010, Apr. 21, 2010, 3812-3818.

Zhao, et al., "Modification of porous poly (vinylidene fluoride) membrane using amphiphilic polymers with different structures in phase inversion process", Journal of Membrane Science 310, Mar. 2008, 567-576.

First Office Action for CN Application No. 201480025277.8 dated Jul. 29, 2016.

Second Office Action for CN Application No. 201480025277.8, dated Jul. 3, 2017.

* cited by examiner

ADVANCEMENTS IN OSMOTICALLY DRIVEN MEMBRANE SYSTEMS INCLUDING LOW PRESSURE CONTROL

RELATED APPLICATIONS

This application is a 371 National Stage application claiming priority to PCT Application No. PCT/US2014/029227 filed Mar. 14, 2014, which application claims the benefit of the earlier filing date of U.S. Provisional Application No. 61/794,537 filed Mar. 15, 2013, which applications are incorporated herein by reference, in their entirety, for any purpose.

GOVERNMENT SPONSORSHIP

This invention was made with Government support under contract number W911NF-09-C-0079 awarded by the Department of Defense. The Government has certain rights in this invention.

TECHNICAL FIELD

Examples described herein relate to separation systems, elements, and methods which may be used for forward osmosis (FO) or reverse osmosis (RO), or generally any separation process.

BACKGROUND

Osmotically driven membrane processes are capable of treating high fouling solutions in an energy efficient manner by using a chemical energy gradient between two solutions to drive water flux across a membrane. Osmotic pre-treatment processes utilize a draw solution with a high osmotic potential, or osmotic pressure, relative to the feed solution to provide a driving force for water transport across a membrane. As relatively pure water flows across the membrane, it dilutes the draw solution.

In an osmotically driven membrane water purification system, the draw solution must then be re-concentrated, or the draw solute recovered in some way for recycling. Typical systems employ either desalination equipment such as reverse osmosis, distillation, or other salt separation technique, or other methods for draw solute recovery such as thermally switching salts. Typically, these systems are controlled as two separate sub-systems, an osmotic system and a re-concentration system, with a buffer volume between them and two separate pumping systems. The separate pumping systems regulate the flowrate and pressure of each stream.

The overall rate of production in an osmotic system is dictated by the flow of water across the osmotic membrane, which is determined in large part by the differential of the draw solution osmotic pressure to the feed solution osmotic pressure. In traditional systems, the draw solution concentration is controlled by adding solute to the draw solution with an injection pump and a draw solution buffer tank.

In all cases, the draw solution osmotic potential must be higher than the feed to be treated. In some cases, high feed water concentrations may necessitate draw solution concentrations that are higher than typically treatable to reconcentrate in lower energy desalination technologies, such as reverse osmosis (RO).

The energy recovery pumps generally used in conventional RO systems can also be operated in a different way in order to be utilized for pressure retarded osmosis (PRO) systems. In PRO systems, a high osmotic potential draw solution is diluted by a low osmotic potential feed solution. The osmotic driving force is partially offset by pressurizing the draw solution, but water flux is still in the direction of the draw solution. The excess water in the draw solution is relieved through an energy generating device such as a turbine.

SUMMARY

Examples of apparatuses and methods for purification are disclosed herein. For example, an apparatus may include a forward osmosis module configured to receive a feed stream, a draw stream, and produce a reject feed stream and an intermediate stream; a pressure sensor which may measure a first pressure on a draw side of the forward osmosis module; and a membrane module which may receive the intermediate stream and produce a product stream. The apparatus may further include a hydraulic pump which may circulate the intermediate stream and pressurize it to a second pressure. The apparatus may further include an energy recovery device which may lower the draw stream from the second pressure to the first pressure; a dosing pump which may provide a concentrated draw solution to the draw stream; and a flow meter which may measure the flow rate of the produce stream.

An example method may include providing a feed stream to a forward osmosis module; providing a draw stream to the forward osmosis module; concentrating the feed stream and circulating the draw stream through the forward osmosis module which may produce an intermediate stream; monitoring a pressure on a draw side of the forward osmosis module; pumping the intermediate stream to another filter module; filtering the intermediate stream with another filter module which may produce the draw stream and a product stream. The method may further include monitoring a flow rate of the product stream and providing solute to the draw stream at a dosing rate that may be based, at least in part, on the flow rate of the product stream.

DETAILED DESCRIPTION

Certain details are set forth below to provide a sufficient understanding of embodiments of the invention. However, it will be clear to one skilled in the art that embodiments of the invention may be practiced without various of these particular details. In some instances, well-known chemical structures, chemical components, molecules, materials, manufacturing components, control systems, electronic components, timing protocols, and software operations have not been shown in detail in order to avoid unnecessarily obscuring the described embodiments of the invention.

Figure 1:
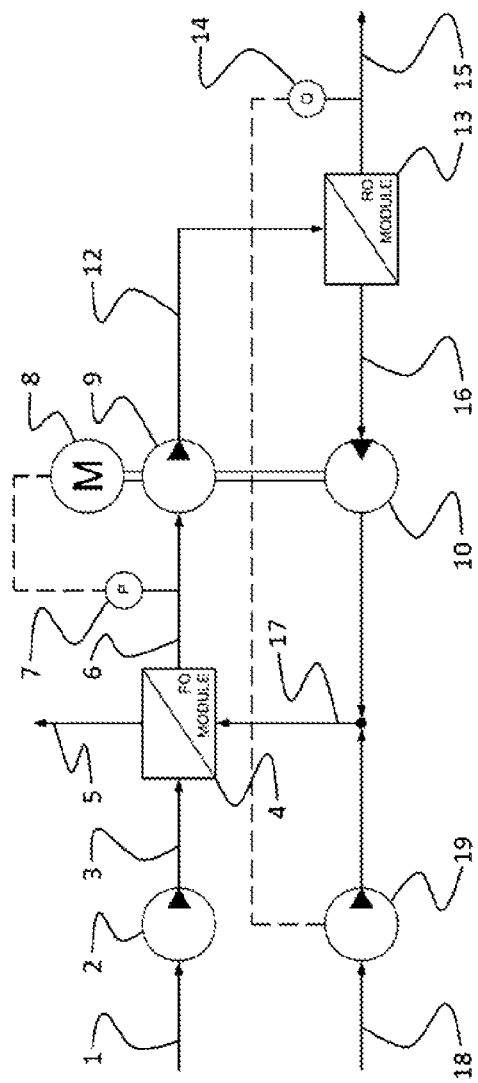
FIG. 1 is a purification system according to an embodiment of the invention.

A purification system 100 according to an embodiment of the invention is illustrated as a block diagram in FIG. 1. In order to avoid unnecessarily obscuring the embodiments of the invention, a system in steady state is considered.

The purification system includes an array of forward osmosis (FO) membrane elements in a FO module 4, which may include one or more FO membrane elements plumbed in series, parallel or some combination of both. The FO module 4 may have four ports—one port for receipt of a feed stream 3, one port for receipt of a draw stream 17, one port for producing a reject feed stream 5, and one port for producing an intermediate stream 6. The purification system 100 further includes another membrane module 13, which may be a reverse osmosis (RO) module. The membrane module 13 may include one or more RO membrane elements plumbed in series, parallel or some combination of both. The membrane module 13 may include three ports—one port for receipt of a pressurized intermediate stream 12, one port for producing a product stream 15, and one port for producing a draw stream 16.

A feed stream 1 may be pressurized by a feed pump 2 forming a low pressure feed stream 3. Generally, any feed stream may be used for which purification is desired, including but not limited to, seawater or wastewater. Stream 3 may be plumbed into an FO module 4, where the flow rate of the stream may be reduced as pure water transfers across the FO membrane at some FO permeate flow rate to the draw stream 17. The feed solute may be retained in the feed stream and rejected from the system in a reject feed stream 5, e.g. a waste stream at a flow rate of stream 3 minus the FO permeate flow rate.

A draw stream 17 may have some osmotic pressure higher than that of the feed solution stream 3 and a hydrostatic pressure near atmospheric and may be plumbed into the array of FO module 4, where the stream may be increased as pure water transfers across the FO membrane from the feed stream 3 at some FO permeate flow rate. The draw stream exits the element forming an intermediate stream 6 (e.g. an intermediate product stream), where it may be pressurized by a pump 9 (e.g. a hydraulic pump powered by an electric motor 8), to a hydrostatic pressure greater than the osmotic pressure of the draw in stream 17, forming a pressurized intermediate product stream 12.

Stream 12 may then be plumbed into an array of membrane elements in membrane module 13, which may in some examples be an RO module, where the flow rate of the stream may be reduced as pure water transfers across the RO membrane at some RO permeate flow rate. This RO permeate forms product stream 15 at some RO permeate flow rate, which is the product water of the system. The RO module 13 may also produce a concentrated draw that exits the RO module 13, forming pressurized draw stream 16, having a flow rate equal to stream 17. Stream 16 is depressurized across a hydraulic motor 10, also referred to as an energy recovery device, forming draw stream 17, which may be at some pressure near atmospheric, recycling the draw solution. In some examples, multiple energy recovery devices may be used.

As the system runs, draw solute may be slowly lost across the FO module 4 and membrane module 13 into the waste stream 5 and product stream 15, respectively. A dosing solution, comprising a concentrated draw solution 18, may be slowly or periodically pumped into the draw loop by a dosing pump 19, which may allow the system to remain in steady state. The solute of the draw solution may be sodium chloride, but other solutes may be used.

As the draw solution is fixed volume (ignoring the input of the concentrated draw stream 18), the mean FO permeate flow rate and RO permeate flow rate may be equal to one another for the system to remain in steady state within minutes. In conventional systems a draw solution buffer tank (not pictured) is added to intermediate product stream 6, allowing for a variable draw solution volume. This draw solution buffer tank allows the FO permeate flow rate and RO permeate flow rate to fluctuate with respect to one another over time, providing for a simple control scheme. Dosing solution may be added without modifying either permeate flow rate.

The draw solution buffer tank of convention systems allows for simpler control of the purification system, but has several disadvantages. Note that disadvantages of conventional systems and advantages of examples described herein are provided by way of example to facilitate understanding. It is to be understood that not all examples may have all, or even any, of the described advantages, and not all examples may solve all, or even any, of the described conventional system disadvantages. One disadvantage of a conventional buffer tank system may be that the buffer tank significantly increases the weight and volume of the purification system. For example a typical system as illustrated in FIG. 1 may have a volume of approximately twenty gallons, and a buffer tank may have a volume of approximately one hundred gallons. Due in part to the large volume, the response time of the conventional system is slow to adapt to changes in feed conditions or required permeate rates. The use of a buffer tank also increases the risk of bio growth. The slow or lack of flow in the buffer tank increases the likelihood of bacteria or other biological material to grow. This bio growth may contaminate the rest of the system, and additional filters or purification elements may be required to remove the bio growth.

Examples described herein include use of a pressure control system which may allow for a purification system without a need for, or a reduced need for, a buffer tank. By removing or reducing the volume of the draw solution buffer tank, the draw solution volume may become a fixed constant, or closer to a fixed constant, negating small changes in volume of the FO module 4, RO module 13, pumps and plumbing components. The resulting FO permeate flow rate and RO permeate flow rate may become hydraulically locked (e.g. equal or in some other fixed relationship) to one another.

Examples of pressure-controlled systems may have the following advantages over conventional state of the art FO/RO systems: A reduced size and weight may result from removing the draw solution buffer tank and reducing the draw volume. Decreased system response time may result from reducing the draw solution volume, allowing the draw solution concentration to be changed more rapidly to adapt to changes in feed conditions or required permeate rates. Decreased risk of bio growth may result from keeping the entire draw solution volume within relatively high velocity plumbing. Precise control of FO draw solution pressure may be possible as a result of removing the exposure of the draw solution to atmospheric pressure. It may also allow the pressure differential between the feed and draw pressure to be precisely controlled resulting in higher flux and lower propensity to fouling. Increased hydraulic efficiency may result from draw solution pressure being conserved as the draw solution is never exposed to atmosphere. These possible advantages may also result in reduced costs of producing and operating the system.

Generally, examples of water purification systems using pressure control include a pump between the FO module and the later membrane module (e.g. RO module) which pressurizes the intermediate stream provided from the FO module to a pressurized intermediate stream provided to the membrane module. The amount of pressurization (e.g. the flow rate of the pump) is related to a pressure on a draw side of the FO module (e.g. anywhere on the low pressure side of the draw loop), which includes the draw stream and the intermediate stream. Accordingly, a pressure sensor may be provided to measure pressure of the intermediate stream provided at an output of the FO module, or pressure of the draw stream provided to the FO module, or pressure on a draw side between elements of the FO module, or combinations thereof. By varying the pump's flow rate in accordance with the draw-side pressure of the FO module, a pressure of an input stream to the later membrane module (e.g. RO module) may be varied, which may vary the permeate flow rate through that later membrane module. In this manner, a flow rate of the product stream provided by the membrane module may be maintained proportional to (e.g. equal to in some examples) a pressure on the draw side of the forward osmosis module. Accordingly, the permeate flow rates through the FO module and the later membrane module may be kept equal in some examples.

Reference is again made to the system illustrated in FIG. 1. For the sake of this example embodiment of the invention, a pressure control system is considered with a single fixed displacement high pressure hydraulic pump 9 driven by electric motor 8, and including an integrated fixed displacement hydraulic motor 10 such that the RO product flow rate is a direct function of electric motor 8 speed. An example of this pump is Spectra Watermakers, Inc. SP5 Pearson Pump and the Danfoss SWPE. A high pressure pump with a separate energy device may also be applicable along with an array of any of these devices. In other examples, other pumps may be used, including pumps whose flow rates are set using other mechanisms than electric motors.

The system may include a pressure sensor or transducer 7 may be positioned to measure pressure of stream 6 or alternately or in addition, may be located on stream 17 (not shown), or alternatively or in addition at a location between elements on a draw side of the FO module 4. A flow meter 14 may additionally in some examples be positioned to measure a flow rate on the RO product steam 15. The flow meter 14 may be replaced with logic that calculates flow in some other way in other examples. When the electric motor 8 is at a constant speed, both the FO permeate flow rate and RO permeate flow rate may be hydraulically locked to a particular value. The hydraulic pressure of the draw solutions in stream 6, 12, 16 and 17 may be determined by the particular permeate flow rates and the osmotic driving forces across the respective modules 4 and 13.

The RO pressures in streams 12 and 16 may go to whatever pressure is required to overcome the osmotic pressure of the draw solution and produce the explicit RO permeate flow rate. The FO pressures in streams 17 and 6 may go to whatever pressures are required to retard or assist the osmotic pressure differential across the FO membrane array 4 to produce the particular FO permeate flow rate. The FO permeate flow rate may require assistance, for example, by increasing feed hydraulic pressure higher than draw hydraulic pressure; or retardation, for example, by increasing draw hydraulic pressure higher than feed hydraulic pressure, due to changes in the feed and draw osmotic pressure, flow rate, temperature, pH, and/or change in membrane performance properties.

During steady state, the system control scheme may control the electric motor 8 speed with feedback from the pressure transducer 7. The system may include a pump controller 20 (e.g. microcontroller, processor, circuitry, or combinations thereof) that may use a proportional integral derivative (PID) control algorithm or other method to set a flow rate of the pump 9 dynamically to maintain a desired pressure at the pressure transducer 7. This pressure may be pre-determined, or calculated in real time to achieve a given pressure differential between the feed and draw hydraulic pressures. If the pressure begins to exceed the desired pressure, it may be an indicator that the system should retard the FO permeate flow rate and the control algorithm may increase the speed of the electric motor 8, thus increasing the FO permeate flow rate (the flow rate water across the membrane or stream 6 less stream 17) and RO permeate flow rate 15. This may alleviate the pressure at the pressure transducer 7, thus removing the retardation of the FO permeate flow rate. If the pressure of the pressure transducer 7 begins to drop below the desired pressure, it may be an indicator that the system should assist the FO permeate flow rate, and the control algorithm may decrease the speed of the electric motor 8, thus decreasing the FO permeate flow rate and RO permeate flow rate. This may return the pressure back to the desired pressure, removing the assistance of the FO permeate flow rate. In some examples the control algorithm may be capable of controlling the low pressure control point at the pressure transducer 7 within 0.1 psi in some examples, 0.2 psi in some examples, 0.3 psi in some examples, 0.4 psi in some examples, 0.5 psi in some examples, 0.6 psi in some examples, 0.7 psi in some examples, 0.8 psi in some examples, 0.9 psi in some examples, 1.0 psi in some examples—larger or smaller tolerances may be used in other examples.

While the system is in steady state, solute may be slowly lost from the draw solution across the FO module 4 and RO module 13. This may result in the gradual decrease of the RO permeate flow rate which may be monitored by the flow meter 14. To maintain a constant RO permeate flow rate, concentrated draw solution is added from stream 18 by pump 19. The pump 19 may be a dosing pump controlled by a concentration controller 21. The concentration controller 21 may be implemented using one or more processors, circuitry, etc. (e.g. a microcontroller). The concentration controller 21 may further be coupled to a flow meter measuring a flow rate of the product stream. The concentration controller 21 may control a speed of the dosing pump 19 based on a flow rate of the product stream. For example, the concentration controller 21 may compare a flow rate of the product stream to a desired flow rate and may control the dosing pump 19 to add solute to maintain the desired flow rate. Adding solute may increase the pressure at the pressure transducer 7, thus increasing the speed of motor 8 and increasing permeate flow rates, accommodating the influx of dosing solution. Similarly, the concentration controller 21 may control the dosing pump 19 to turn off (or slow down) to reduce a rate of solute addition to maintain a desired flow rate. When pump 19 turns off, the pressure may decrease below the set point and may decrease the speed of motor 8 and decrease the permeate flow rates. Thus the dosing flow rate and duty cycle may control the permeate flow rates of the system using the permeate flow meter 14 as feedback. The dosing point may be anywhere in the draw system, streams 17, 6, 12, 16. An advantage to being located on the low pressure side as illustrated in FIG. 1, may be reduced costs by reducing the number of high pressure components that may be required.

Table 1 contains example flow rates, hydrostatic pressures, and concentrations of solute for different points in the system illustrated in FIG. 1. The values given in Table 1 are exemplary and should not be interpreted to limit the embodiments of the invention to the values given. Other values of flow rates, hydrostatic pressures, and concentrations of solute may be possible.

TABLE 1

Exemplary Values for Water Purification System 100

| | Element number in FIG. 1 | Flow (gpm) | Hydrostatic pressure (psi) | Concentration (ppm) |
|---|---|---|---|---|
| Feed | 3 | 6.25 | 5.0 | 32,000 |
| Feed Reject | 5 | 5.00 | 0.0 | 42,000 |
| FO draw reject (set point 7) | 6 | 6.25 | 0.5 (set point 7) | 44,900 |
| RO draw feed | 12 | 6.25 | 700.0 | 44,900 |
| System permeate (control point 14) | 15 | 1.25 | 0.0 (set point 14) | 350 |
| RO draw reject | 16 | 5.00 | 685.0 | 56,125 |
| FO draw feed | 17 | 5.00 | 3.0 | 56,125 |

Figure 2:
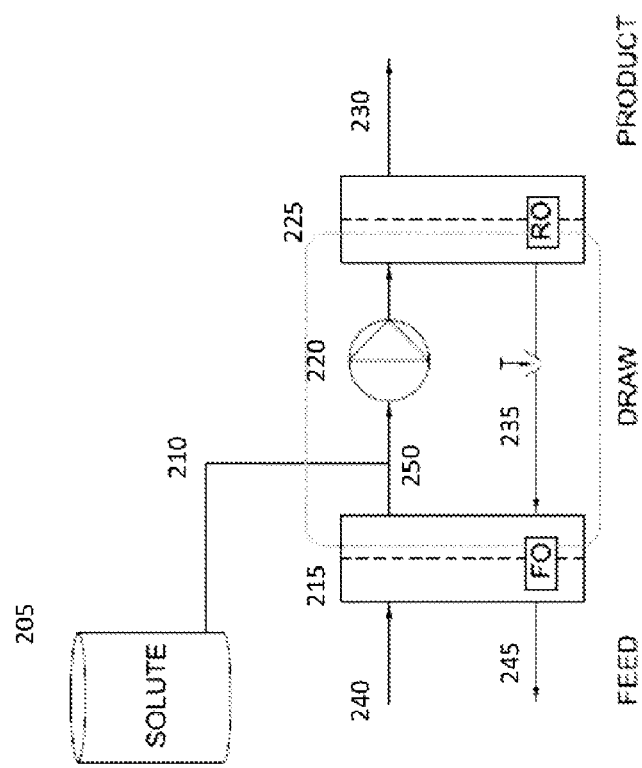
FIG. 2 is a purification system according to another embodiment of the invention.

Examples of passively connected draw solute tanks are also described herein. With the passively connected draw solute tank, the change in pressure of the draw solution loop either draws solute into, or pushes solute out of the loop. Simplification of the controls has the advantages of decreased costs, weight, and size, and improved stability, performance, and reliability. A block diagram of an example passively connected draw solute tank system 200 according to an embodiment of the invention is illustrated in FIG. 2. A forward osmosis module 215, or osmotic pre-treatment system, may receive a feed stream 240 and a draw stream 235. The FO module 215 produces an intermediate product stream 250, which may be pressurized by pump 220 to reverse osmosis module 225, or reconcentration system. The RO module may produce a product stream 230 and return the draw stream 235 to the FO module 215. The draw solute tank 205 may be passively connected to the system by stream 210.

The passive draw solute tank system may operate by balancing the production rate with the draw solution osmotic potential. If the desired production rate of a system is greater than the system is currently producing, the re-concentration system may be accelerated, producing additional water. As this additional water is produced, it may not be met by an increased production through the osmotic pre-treatment system, because the osmotic pressure differential across the osmotic membrane may still be the same. Because of the difference in the mass balance, the volume of the draw solution loop may be decreased. Concentrated draw solute may then be drawn into the draw solution loop from the draw solute tank, increasing the concentration of the draw solution, and thus increasing the water production through the osmotic pre-treatment. This additional flow may occur until the flow through the osmotic pre-treatment system is equal to the flow through the re-concentration system and the system is stabilized. If the desired production rate of a system is less than the system is currently producing, the re-concentration system may be decelerated. With the re-concentration running at a lower speed, less water may be produced. As less water is produced, it may not be met by a decreased production through the osmotic pre-treatment system, because the osmotic pressure differential across the osmotic membrane may still be the same. Because of the difference in the mass balance, the volume of the draw solution loop may be increased. Draw solute may then be pushed from the draw solution to the draw solute tank, effectively reducing the concentration of the draw solution, and thus may decrease the water production through the osmotic pre-treatment. This removal of solute from the draw solution loop may occur until the flow through the osmotic pre-treatment system is equal to the flow through the re-concentration system and the system is stabilized. The excess draw solute that was ejected from the system may either be rejected or retained in the draw solute tank and used at a later time when increased draw solute is needed.

In processes such as pressure retarded osmosis (PRO), which may require a water supply to pressurize the stream and generate useful energy from the high pressure water return, conventional energy recovery pumps may be modified to operate in reverse, with the high volume side of the pump being the membrane reject, as opposed to the supply as is normally done in conventional processes. A PRO pump combines two separate components into a single component. The low volume side of the pump may draw in brine, such as concentrated aqueous sodium chloride or seawater, at low hydraulic pressure, the piston may pressurize the stream, and pump the brine to the PRO membrane elements. In the PRO membrane elements, the brine is diluted, and the volume increases. This may force the brine out to the high volume side of the pump where the high pressure on the high volume side of the piston serves to pressurize the low volume inlet, as well as generates extra force on the pump shaft. After the energy is recovered from the high pressure high volume stream, the low pressure high volume diluted brine is discharged from the pump. The advantages of the PRO pump may be a more compact design, decreased weight, increased hydraulic and electrical efficiency and simplicity.

Figure 3:
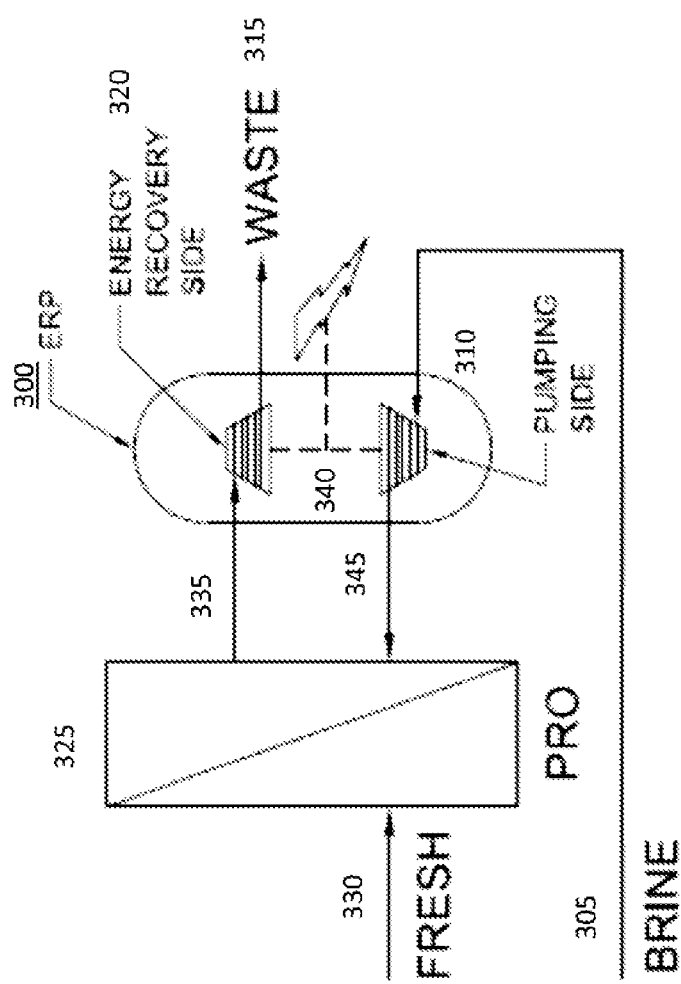
FIG. 3 is an energy recovery device according to an embodiment of the invention.

Examples of energy recovery pumps are also described herein. Energy recovery pump 300 according to an embodiment of the invention is illustrated as a block diagram in FIG. 3. The Fixed Recovery Positive Displacement Energy Recovery Pump may be used to generate power from a PRO system. A brine feed 305 to the system may be fed to the low volume inlet of the pump 310. The pump may pressurize this influent draw stream, and pump the pressurized stream 345 to the PRO membrane vessels 325. The PRO membrane vessels may also receive a low osmotic pressure stream 330. The low osmotic pressure stream 330 may be fresh water, river water, or wastewater in some examples. The high pressure draw stream return 335 from the PRO membrane vessels 325 is fed to the high volume inlet of the pump 320, and is then discharged at low pressure out of the system as waste 315. The pump shaft 340 is used to drive electrical generating equipment (not shown).

From the foregoing it will be appreciated that, although specific embodiments of the invention have been described herein for purposes of illustration, various modifications may be made without deviating from the spirit and scope of the invention.

What is claimed is:

1. An apparatus comprising:
   a forward osmosis module configured to receive a feed stream and a draw stream, the forward osmosis module further configured to produce a reject feed stream and an intermediate stream;
   a pressure sensor configured to measure a first pressure of one or more of the intermediate stream on a draw side of the forward osmosis module, the draw stream provided to the forward osmosis module, or draw stream on the draw side between elements of the forward osmosis module;
   a hydraulic pump configured to receive the intermediate stream and to provide a pressurized intermediate stream at a second pressure;
   a membrane module configured to receive the pressurized intermediate stream, the membrane module further configured to produce a concentrated draw stream and a product stream each having a flow rate based, at least in part, on the first pressure; and a pump controller coupled to the pressure sensor and the hydraulic pump, wherein the pump controller is configured to compare the first pressure to a selected pressure, and is further configured to direct the hydraulic pump to increase the flow rate of the product stream when the first pressure is above the selected pressure and decrease the flow rate of the product stream when the first pressure is below the selected pressure.

2. The apparatus of claim 1, further comprising:

at least one energy recovery device, the at least one energy recovery device configured to lower a pressure of the concentrated draw stream to a pressure of the draw stream;

a dosing pump, configured to provide a concentrated draw solution to the draw stream; and a flow meter, coupled to the dosing pump, configured to measure the flow rate of the product stream, wherein the dosing pump is controlled in part by the flow meter such that an amount of concentrated draw solution provided by the dosing pump is based, at least in part on the flow rate of the product stream.

3. The apparatus of claim 2, further comprising a concentration controller coupled to the flow meter and the dosing pump, wherein the concentration controller is configured to control a speed of the dosing pump based, at least in part, on the flow rate of the product stream.

4. The apparatus of claim 3, wherein the concentration controller is configured to compare a flow rate of the product stream to a selected flow rate and is further configured to add solute using the dosing pump to maintain the selected flow rate.

5. The apparatus of claim 2, wherein the at least one energy recovery device is a fixed displacement recovery device.

6. The apparatus of claim 2, further comprising a concentration controller operably coupled to the flow meter and the dosing pump, wherein the concentration controller is configured to direct the dosing pump to increase the amount of draw solute in the draw stream or the concentrated draw stream when the flow rate of the product stream is below a selected flow rate or decrease or stop addition of the draw solute when the flow rate of the product stream is above a selected flow rate.

7. The apparatus of claim 1, wherein a volume of the intermediate stream, the draw stream, the pressurized intermediate stream, and the concentrated draw stream is fixed.

8. The apparatus of claim 1, wherein a permeate flow rate through the forward osmosis module is configured to be equal to a permeate flow rate through the membrane module.

9. The apparatus of claim 1, wherein the pump controller is configured to maintain the first pressure within 1 psi of the selected pressure.

10. The apparatus of claim 1, wherein the pump controller is configured to execute a proportional integral derivative control algorithm.

11. The apparatus of claim 1, wherein the hydraulic pump is a fixed volume displacement pump.

12. The apparatus of claim 1, further comprising a feed pump configured to pump the feed stream to the forward osmosis module.

13. The apparatus of claim 1, wherein the pump controller is configured to direct the hydraulic pump to increase the flow rate of the product stream when the first pressure is above the selected pressure and decrease the flow rate of the product stream when the first pressure is below the selected pressure to maintain the first pressure within a threshold of the selected pressure.

* * * * *